US012644687B2

(12) United States Patent
    Ramstead

(10) Patent No.: US 12,644,687 B2
(45) Date of Patent: Jun. 2, 2026

(54) WHEEL FITMENT TOOL

(71) Applicant: Clayton Leroy Ramstead, Cedar Rapids, IA (US)

(72) Inventor: Clayton Leroy Ramstead, Cedar Rapids, IA (US)

( * ) Notice: Subject to any disclaimer, the term of this patent is extended or adjusted under 35 U.S.C. 154(b) by 262 days.

(21) Appl. No.: 18/348,598

(22) Filed: Jul. 7, 2023

(65) Prior Publication Data

US 2024/0011753 A1      Jan. 11, 2024

Related U.S. Application Data

(60) Provisional application No. 63/367,836, filed on Jul. 7, 2022.

(51) Int. Cl.
    *G01B 5/08*          (2006.01)

(52) U.S. Cl.
    CPC ...................................... *G01B 5/08* (2013.01)

(58) Field of Classification Search
    CPC ....................................................... G01B 5/08
    USPC ...................... 33/203, 203.18, 203.19, 203.2
    See application file for complete search history.

(56) References Cited

U.S. PATENT DOCUMENTS

| | | | | |
|---|---|---|---|---|
| 3,758,958 A | * | 9/1973 | Jordan | G01B 5/255 |
| | | | | 33/336 |
| 4,441,258 A | * | 4/1984 | McDaniel | G01B 5/025 |
| | | | | 33/759 |

| | | | | |
|---|---|---|---|---|
| 4,607,436 A | * | 8/1986 | Clay | G01B 3/006 |
| | | | | D10/73 |
| 4,730,399 A | * | 3/1988 | Campbell | G01B 5/0025 |
| | | | | 33/600 |
| 4,953,307 A | | 9/1990 | Loucas | |
| 5,044,090 A | * | 9/1991 | Hunter | G01B 3/1071 |
| | | | | 33/760 |
| 5,101,569 A | | 4/1992 | Watkins | |
| 5,174,032 A | * | 12/1992 | Beck | G01B 5/0025 |
| | | | | 33/203.18 |
| 5,398,419 A | | 3/1995 | Schmidt, Jr. et al. | |
| 5,412,878 A | | 5/1995 | Edman | |
| 5,446,967 A | | 9/1995 | Gender | |
| 5,509,208 A | * | 4/1996 | Oja | G01B 5/143 |
| | | | | 33/810 |
| 5,517,759 A | | 5/1996 | Hill et al. | |
| 5,600,435 A | * | 2/1997 | Bartko | H04N 7/181 |
| | | | | 348/E7.086 |
| 5,694,697 A | * | 12/1997 | Curtis | G01B 5/08 |
| | | | | 33/555.1 |
| 6,035,729 A | | 3/2000 | Weinmann | |

(Continued)

*Primary Examiner* — George B Bennett

(74) *Attorney, Agent, or Firm* — Dunlap Bennett & Ludwig PLLC

(57)                 ABSTRACT

A wheel fitment tool is disclosed. The wheel fitment tool includes a hub plate, a wheel diameter measurement portion adjustably coupled to the hub plate using a hub standoff, a wheel width measurement portion adjustably coupled to the wheel diameter measurement portion, and a wheel offset measurement portion adjustably coupled to the wheel width measurement portion. In operation, a user may set the wheel diameter measurement portion, wheel width measurement portion, and wheel offset measurement portion to desired settings and attach the wheel fitment tool to a wheel hub, enabling a user to determine if certain wheel sizes are usable on a desired vehicle.

8 Claims, 6 Drawing Sheets

(56)                References Cited

U.S. PATENT DOCUMENTS

| | | | | |
|---|---|---|---|---|
| 6,282,799 B1 * | 9/2001 | Warkotsch | ............ | G01B 5/255 |
| | | | | 33/203.18 |
| 6,349,593 B1 | 2/2002 | Blair | | |
| 6,725,168 B2 | 4/2004 | Shiraishi et al. | | |
| 6,957,498 B2 * | 10/2005 | Tsai | ........................ | G01B 5/201 |
| | | | | 33/783 |
| 7,073,267 B2 * | 7/2006 | Butler | ........................ | G01B 3/20 |
| | | | | 33/203.18 |
| 7,380,344 B2 | 6/2008 | Dietrich | | |
| 7,610,685 B2 | 11/2009 | Percival | | |
| 7,877,883 B2 | 2/2011 | Schommer et al. | | |
| 7,941,933 B2 * | 5/2011 | Warkotsch | ............ | G01M 1/045 |
| | | | | 33/203.18 |
| 9,109,973 B2 | 8/2015 | Inhoff et al. | | |
| 11,376,896 B2 * | 7/2022 | Wehrs | ........................ | G01B 7/12 |
| 2014/0188406 A1 | 7/2014 | Stalnaker et al. | | |

* cited by examiner

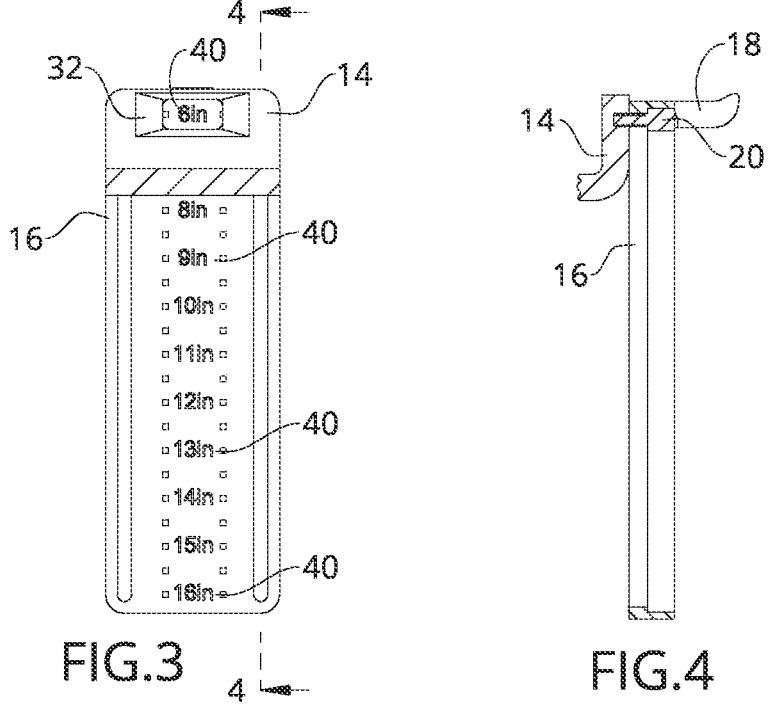
FIG.3
FIG.4
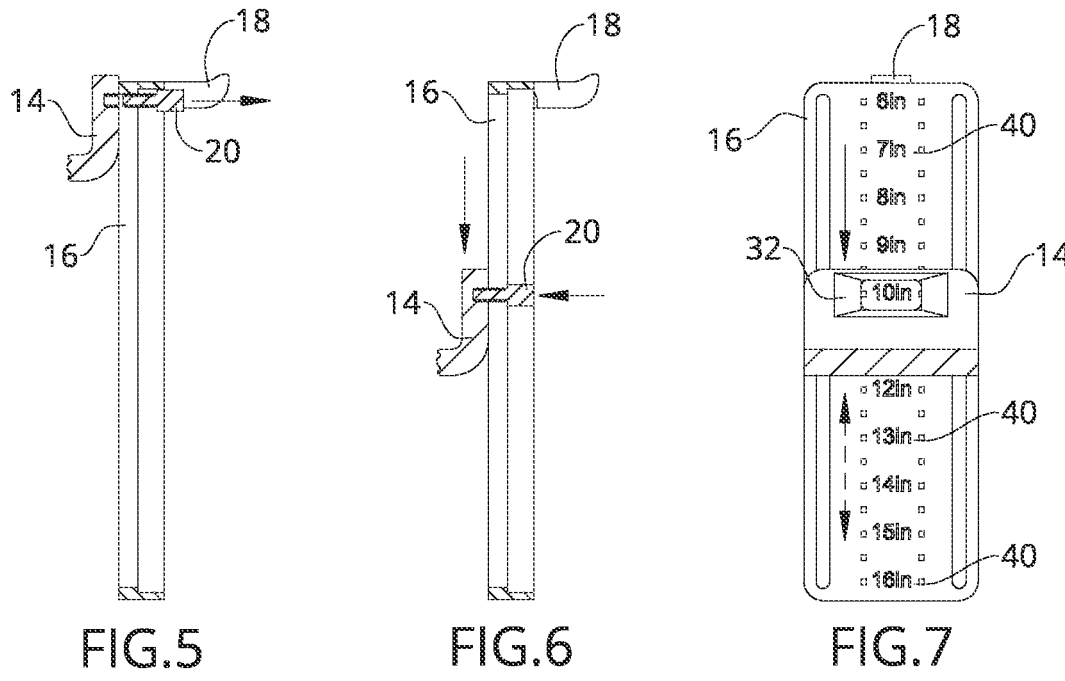
FIG.5        FIG.6        FIG.7

WHEEL FITMENT TOOL

CROSS-REFERENCE TO RELATED APPLICATION

This application claims the benefit of priority of U.S. provisional application No. 63/367,836, filed Jul. 7, 2022, the contents of which are herein incorporated by reference.

BACKGROUND OF THE INVENTION

The present invention relates to vehicle tools and, more particularly, to a wheel fitment tool for testing a variety of wheel dimensions on a vehicle.

When a person is purchasing new wheels for a vehicle it can be difficult to determine what wheel width and wheel offset will fit as desired on the vehicle. Conventional wheel fitment devices hold a tire in place and are very bulky, difficult to store, and expensive to purchase. Such conventional devices are best suited for commercial applications as opposed to private individual use. Thus private consumers often must deal with businesses that don't have their desired wheel style or type but are able to purchase and house conventional wheel fitment devices in order to get an accurate measurement that they customer can then use to purchase new wheels.

As can be seen, there is a need for a wheel fitment tool for use with testing a plurality of wheel dimensions on a vehicle where the tool is easy to use, easy to store, and inexpensive. The present invention solves these issues by providing a simplified and inexpensive tool that can be set to any desired wheel size and offset, and easily attached to a wheel hub of a vehicle to see if a desired wheel fits on the vehicle. The present invention thus allows consumers to accurately and reliably test wheel sizes and offsets on their own without the need of a mechanic or other business using conventional wheel fitment devices.

SUMMARY OF THE INVENTION

In one aspect of the present invention, a wheel fitment tool is provided, the wheel fitment tool comprising a hub plate, a wheel diameter measurement portion adjustably coupled to the hub plate via a hub standoff, a wheel width measurement portion adjustably coupled to the wheel diameter measurement portion, and a wheel offset measurement portion adjustably coupled to the wheel width measurement portion on a side of the wheel width measurement portion opposite from the wheel diameter measurement portion.

In another aspect of the present invention, the hub plate comprises an arcuate extension connecting a plurality of oblong hub plate holes. A main plate extends between at least two of the plurality of oblong hub plate holes, and the hub standoff is fastened to the main plate. Additionally, each of the remaining oblong hub plate holes form cantilever extensions on one side of the arcuate extension of the hub plate.

In another aspect of the present invention, the wheel diameter measurement portion comprises a substantially rectangular first diameter plate, and a second diameter plate extending perpendicularly from a first end of the first diameter plate. The first diameter plate further includes a plurality of diameter measurements, wherein each of the plurality of diameter measurements includes a pair of holes on opposing sides of the first diameter plate, and each of the plurality of diameter measurements are configured to be releasably fastened to the hub standoff. Additionally, the second diameter plate includes a wheel width viewing window configured to allow a user to view width measurement indicia formed on the wheel width measurement portion, and the second diameter plate includes at least one diameter borehole configured to allow the wheel width measurement portion to be releasably fastened to the second diameter plate.

In another aspect of the present invention, the wheel width measurement portion includes at least one width connection slot extending along a length of the wheel width measurement portion within a raised edge of the wheel width measurement portion. Additionally, the wheel width measurement portion includes two raised edges extending along a length of the wheel width measurement portion and forming a channel therebetween. The wheel offset measurement portion is slidably held within the channel of the wheel width measurement portion.

In another aspect of the invention, the wheel offset measurement portion includes an offset connection slot extending along the length of the wheel offset measurement portion to enable the wheel offset measurement portion to be adjustably coupled to the wheel width measurement portion. The wheel offset measurement portion includes an offset window that cooperates with the wheel width measurement portion to allow a user to read offset measurement indicia formed on the wheel width measurement portion.

These and other features, aspects and advantages of the present invention will become better understood with reference to the following drawings, description, and claims.

BRIEF DESCRIPTION OF THE DRAWINGS

FIG. 3 is cross-sectional view thereof taken along line 3-3 in FIG. 1;

FIG. 4 is a cross-sectional view thereof taken along line 4-4 in FIG. 3;

FIGS. 5 & 6 are cross-sectional views thereof taken along line 4-4 in FIG. 3 depicting a rearrangement of components on a wheel width measurement portion of the wheel fitment tool;

FIG. 7 is a cross-sectional view of the wheel fitment tool taken along line 3-3 in FIG. 1 depicting the adjustability of the wheel width measurement portion of the wheel fitment tool;

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a tool that allows a user to set the wheel dimensions they would like to test on the tool, then mount the tool on the hub of the vehicle for a quick result. This tool provides a simplified way of determining the desired offset for a wheel as it appears with the fender of the vehicle, without excessive cost and materials of larger tools that hold a tire in place. This tool is small and easy to store and is better suited for an individual person to use at home.

Figure 1:
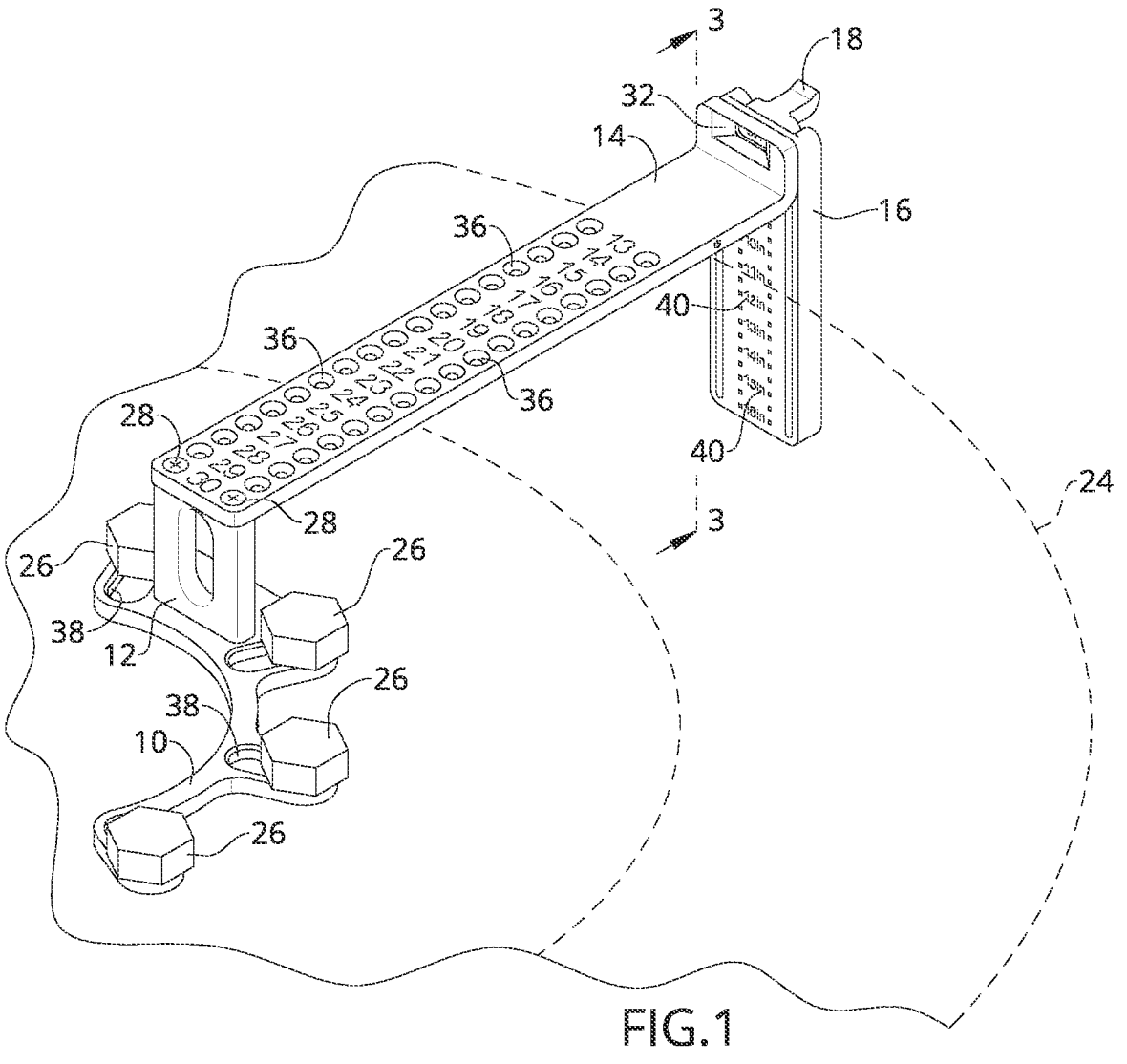
FIG. 1 is a perspective view of a wheel fitment tool in accordance with an embodiment of the present invention.
Figure 2:
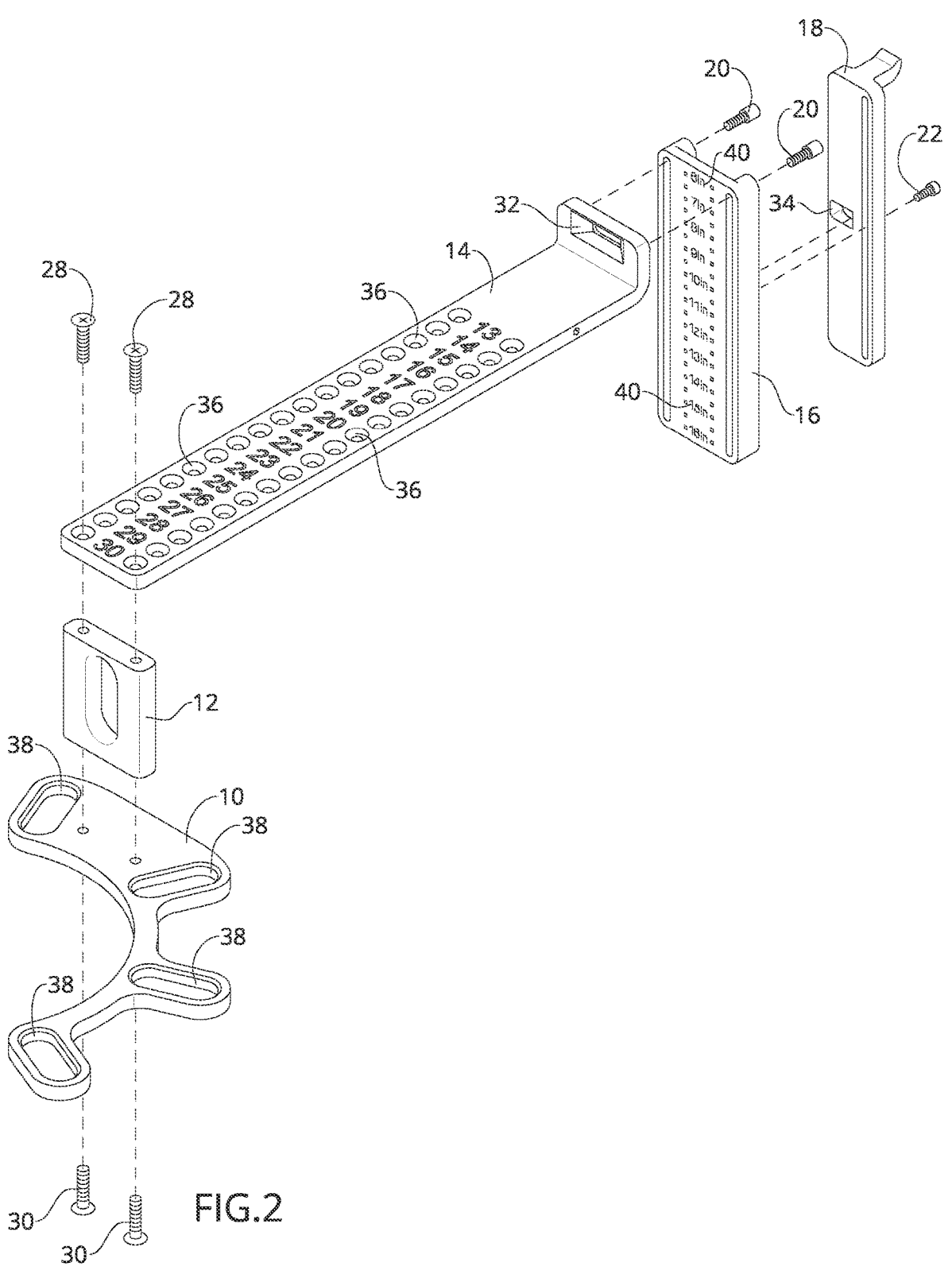
FIG. 2 is an exploded view thereof.
Figures 8, 9, 10, 11, 12:
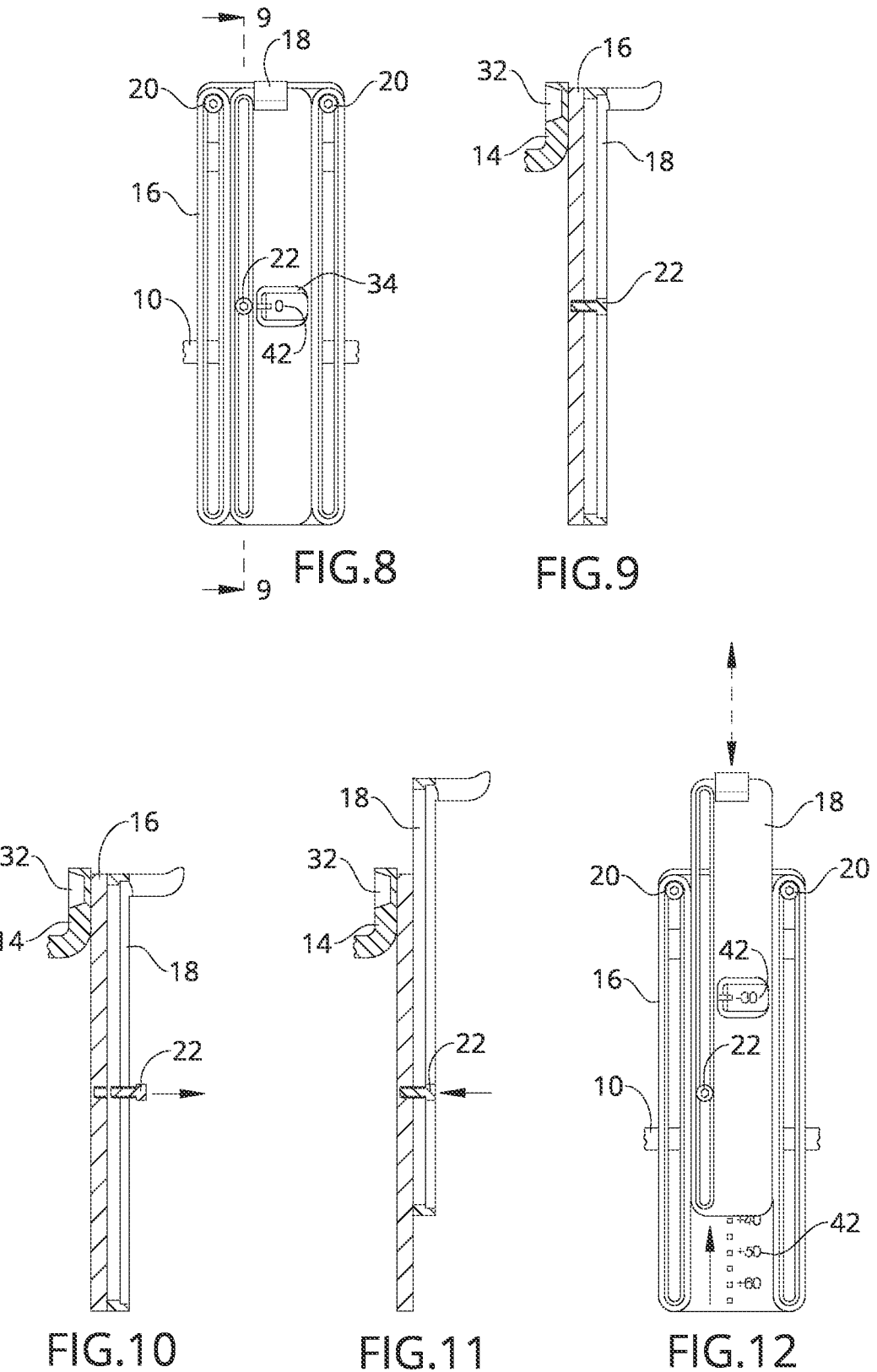
FIG. 8 is a rear view of the wheel fitment tool.
FIG. 9 is a cross-sectional view thereof taken along line 9-9 in FIG. 8.
FIGS. 10 & 11 are cross-sectional views thereof taken along line 9-9 in FIG. 8 depicting a rearrangement of components on a wheel offset measurement portion of the wheel fitment tool.
FIG. 12 is a rear view of the wheel fitment tool depicting the adjustability of the wheel offset measurement portion of the wheel fitment tool.
Figures 13, 14, 15, 16:
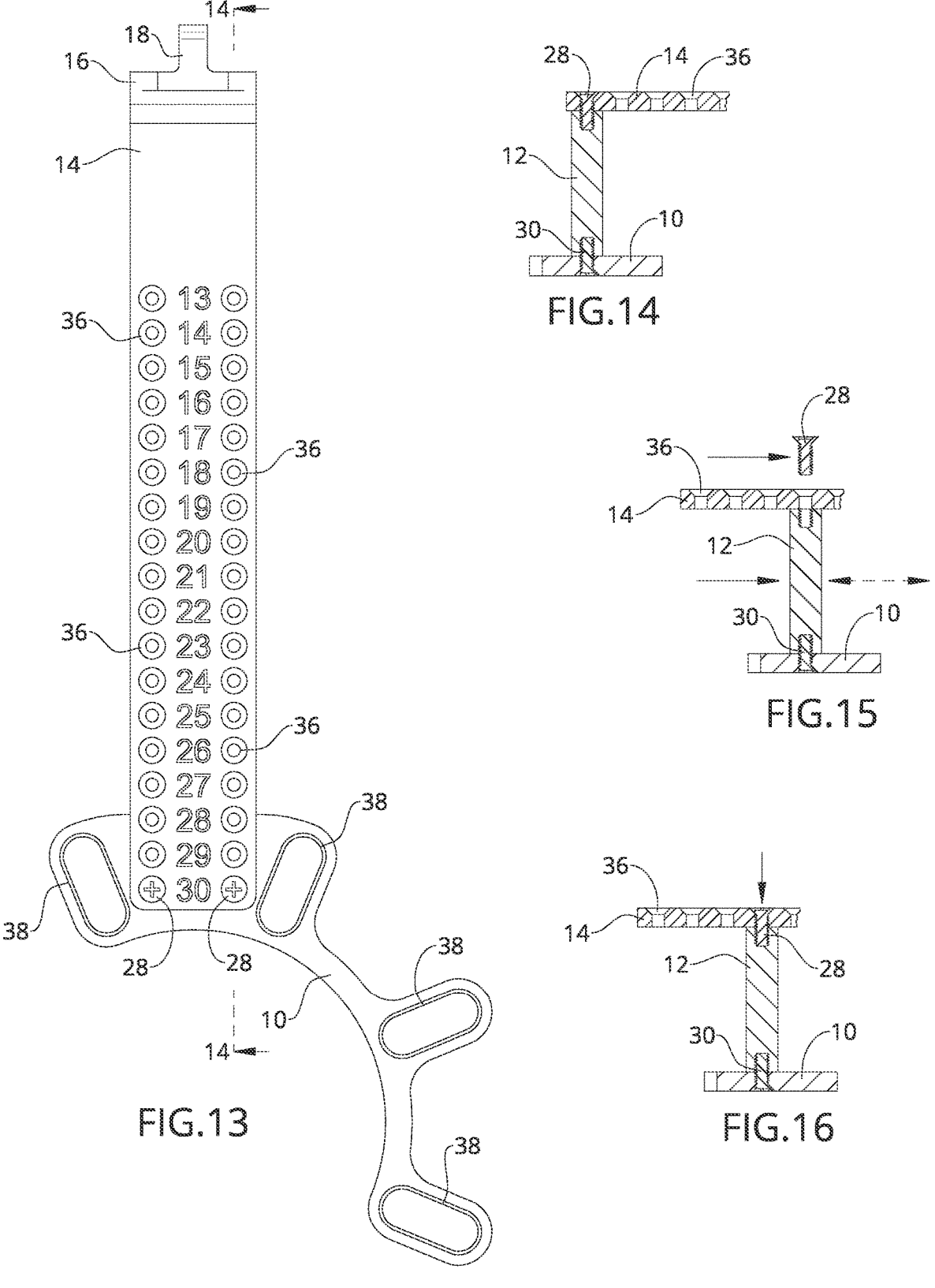
FIG. 13 is a top view of the wheel fitment tool.
FIG. 14 is a cross-sectional view thereof taken along line 14-14 in FIG. 13.
FIGS. 15 & 16 are cross-sectional views thereof taken along line 14-14 in FIG. 13 depicting a rearrangement of components on a hub diameter measurement portion of the wheel fitment tool.
Figure 17:
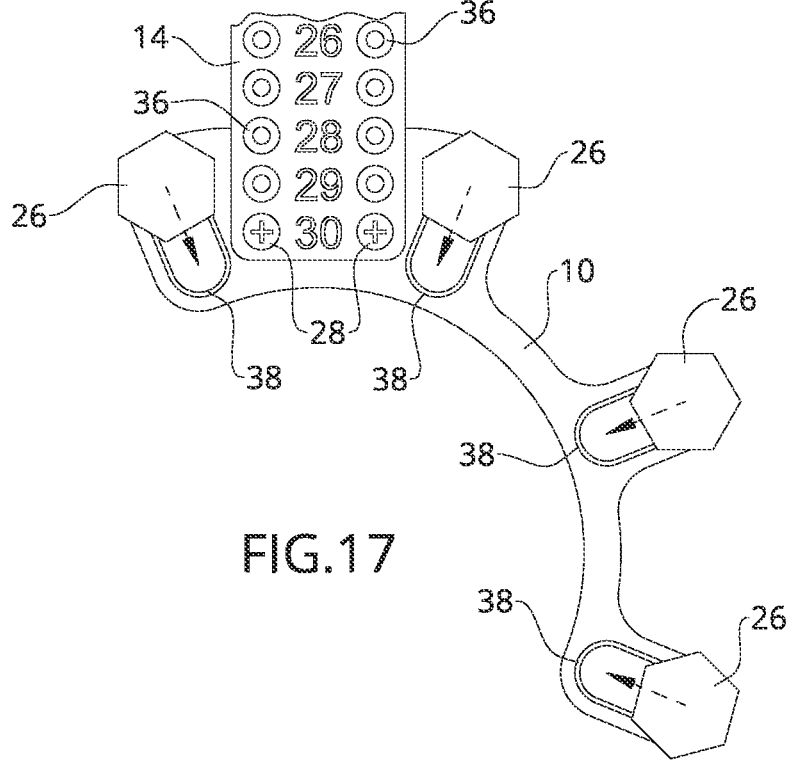
FIG. 17 is a top view of a hub plate of the wheel fitment tool.

Referring now to FIGS. 1-17, a wheel fitment tool in accordance with an embodiment of the present invention is shown. The wheel fitment tool generally includes a hub plate 10, a hub standoff 12, a wheel diameter measurement portion 14, a wheel width measurement portion 16, and a wheel offset measurement portion 18. The hub plate 10 is used to mount the wheel fitment tool to a wheel hub of a vehicle wheel 24. The hub standoff 12 is used to couple the hub plate 10 to the wheel diameter measurement portion 14. The wheel diameter measurement portion 14 is used to set the desired wheel diameter to be tested. The wheel width measurement portion 16 is used to set the desired wheel width to be tested. The wheel offset measurement portion 18 is used to set the desired wheel offset to be tested.

The hub plate 10 comprises an arcuate extension connecting a plurality of oblong hub plate holes 38. A main plate extends between at least two of the plurality of oblong hub plate holes 38, and the hub standoff 12 is fastened to the main plate using hub plate fasteners 30 (e.g., screws). Additionally, each of the remaining oblong hub plate holes 38 form cantilever extensions on one side of the arcuate extension of the hub plate. Each of the plurality of oblong hub plate holes 38 cooperates with wheel fasteners 26 (e.g., bolts) to couple the wheel fitment tool to a wheel hub of a vehicle wheel 24.

The wheel diameter measurement portion 14 comprises a substantially rectangular first diameter plate, and a second diameter plate preferably extending perpendicularly from a first end of the first diameter plate. The first diameter plate further includes a plurality of diameter measurements indicating the diameter to be tested. Each of the plurality of diameter measurements includes a pair of holes 36 on opposing sides of the first diameter plate, with each pair of holes 36 associated with a number indicating a particular diameter measurement. Each of the plurality of diameter measurements are configured to be adjustably coupled to the hub standoff 12 via standoff fasteners 28 (e.g. screws) at the set wheel diameter to be tested. Additionally, the second diameter plate includes a beveled wheel width viewing window 32 configured to allow a user to set a wheel width to be tested by viewing width measurement indicia 40 formed on a first side of the wheel width measurement portion 16. The second diameter plate also may include two diameter boreholes to allow the first side of the wheel width measurement portion 16 to be adjustably coupled to the second diameter plate using wheel width fasteners 20 (e.g., set screws).

The wheel width measurement portion 16 may include two width connection slots extending along a length of the wheel width measurement portion 16. Each width connection slot cooperates with the diameter boreholes in the second diameter plate to adjustably couple the wheel width measurement plate 16 to the second diameter plate of the wheel diameter measurement portion 14. Each width connection slot is formed within a raised edge formed on a second side of the wheel width measurement portion 16 that is opposite the first side of the wheel width measurement portion 16. The raised edges form a channel on the second side of the wheel width measurement portion 16. The channel extends for the full length of the wheel width measurement portion 16 and includes offset measurement indicia 42 formed on the second side of the wheel width portion 16.

The wheel offset measurement portion 18 is slidably held within the channel of the wheel width measurement portion 16. An offset connection slot extends along the length of the wheel offset measurement portion 18 and cooperates with a wheel offset fastener 20 (e.g. a set screw) to adjustably couple the wheel offset measurement portion 18 to the second side of the wheel width measurement portion 16 at the desired offset to be tested. The wheel offset measurement portion further includes a beveled offset window 34 to allow a user to set the desired offset to be tested by viewing the offset measurement indicia 42 formed on the second side of the wheel width measurement portion 16. A tab may extend perpendicularly from a top edge of the wheel offset measurement portion 18 may further include a tab to enable easier movement of the wheel offset measurement portion 18.

In an exemplary embodiment, the wheel fitment tool may be made and assembled as described above and as follows. The method of manufacture for the wheel fitment tool is not particularly limited. The wheel fitment tool may be formed using any appropriate process, including, but not limited to, injection molding or 3-D printing. Further, the material of manufacture for the wheel fitment tool are not particularly limited. For example, the wheel fitment tool may be formed of metals, plastics, or woods.

In an exemplary embodiment, the wheel fitment tool may be used as follows. A user may first set a desired wheel diameter, wheel width, and wheel offset they would like to test for their vehicle on the wheel fitment tool by adjusting the positioning of the wheel diameter measurement portion 14, the wheel width measurement portion 16, and the wheel offset measurement portion 18, respectively. The user may then mount the hub plate 12 of the wheel fitment tool on the wheel hub of their vehicle wheel 24 to view how the settings being tested appear in relation to the body of the vehicle. In this manner, the present invention provides a simple, convenient, and inexpensive means for the user to test their vehicle for a desired wheel size.

While one or more preferred embodiments are disclosed, many other implementations will occur to one of ordinary skill in the art and are all within the scope of the invention. Each of the various embodiments described above may be combined with other described embodiments in order to provide multiple features. Furthermore, while the preceding describes a number of separate embodiments of the apparatus and method of the present invention, what has been described herein is merely illustrative of applying the principles of the present invention. Other arrangements, methods, modifications, and substitutions by one of ordinary skill in the art are therefore also considered within the scope of the present invention, which is not to be limited except by the claims directed to the present invention.

While apparatuses and methods are described in terms of "comprising," "containing," or "including" various components or steps, the apparatuses and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted. Moreover, the use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refers to only A, only B, or only C; any combination of A, B, and C; and/or at least one of each of A, B, and C.

It should be understood, of course, that the foregoing relates to exemplary embodiments of the invention and that modifications may be made without departing from the spirit and scope of the invention as set forth in the following claims.

What is claimed is:

1. A wheel fitment tool comprising:
a hub plate;
a wheel diameter measurement portion adjustably coupled to the hub plate via a hub standoff;
a wheel width measurement portion adjustably coupled to the wheel diameter measurement portion; and a wheel offset measurement portion adjustably coupled to the wheel width measurement portion on a side of the wheel width measurement portion opposite from the wheel diameter measurement portion, wherein the wheel diameter measurement portion comprises a substantially rectangular first diameter plate, and a second diameter plate extending perpendicularly from a first end of the first diameter plate, and wherein the first diameter plate includes a plurality of diameter measurements, wherein each of the plurality of diameter measurements includes a pair of holes on opposing sides of the first diameter plate, and each of the plurality of diameter measurements are configured to be releasably fastened to the hub standoff.

2. The wheel fitment tool of claim 1, wherein the hub plate comprises an arcuate extension connecting a plurality of oblong hub plate holes, wherein a main plate extends between at least two of the plurality of oblong hub plate holes, the hub standoff is fastened to the main plate, and each of the remaining oblong hub plate holes form cantilever extensions on one side of the arcuate extension of the hub plate.

3. The wheel fitment tool of claim 1, wherein the second diameter plate includes a wheel width viewing window configured to allow a user to view width measurement indicia formed on the wheel width measurement portion, and the second diameter plate includes at least one diameter borehole configured to allow the wheel width measurement portion to be releasably fastened to the second diameter plate.

4. The wheel fitment tool of claim 1, wherein the wheel width measurement portion includes at least one width connection slot extending along a length of the wheel width measurement portion within a raised edge of the wheel width measurement portion.

5. The wheel fitment tool of claim 1, wherein the wheel width measurement portion includes two raised edges extending along a length of the wheel width measurement portion and forming a channel therebetween.

6. The wheel fitment tool of claim 5, wherein the wheel offset measurement portion is slidably held within the channel of the wheel width measurement portion.

7. The wheel fitment tool of claim 1, wherein the wheel offset measurement portion includes an offset connection slot extending along the length of the wheel offset measurement portion to enable the wheel offset measurement portion to be adjustably coupled to the wheel width measurement portion.

8. The wheel fitment tool of claim 1, wherein the wheel offset measurement portion includes an offset window that cooperates with the wheel width measurement portion to allow a user to read offset measurement indicia formed on the wheel width measurement portion.

* * * * *